(12) United States Patent
Metsker et al.

(10) Patent No.: US 7,650,304 B1
(45) Date of Patent: Jan. 19, 2010

(54) SOLICITATION TO WEB MARKETING LOOP PROCESS

(75) Inventors: Steven Metsker, Richmond, VA (US); Benjamin F. Abbott, Richmond, VA (US); Richard Grantham, Parkhurst (ZA); David Johnston, Richmond, VA (US)

(73) Assignee: Capital One Financial Corporation, McLean, VA (US)

(*) Notice: Subject to any disclaimer, the term of this patent is extended or adjusted under 35 U.S.C. 154(b) by 1176 days.

(21) Appl. No.: 09/658,186

(22) Filed: Sep. 8, 2000

(51) Int. Cl.
*G06Q 40/00* (2006.01)
(52) U.S. Cl. .......................... 705/37; 705/38
(58) Field of Classification Search .............. 705/27, 705/35, 37–38, 14; 707/4
See application file for complete search history.

(56) References Cited

U.S. PATENT DOCUMENTS

| | | | |
|---|---|---|---|
| 4,775,935 A | 10/1988 | Yourick | |
| 4,870,579 A | 9/1989 | Hey | |
| 4,992,940 A | 2/1991 | Dworkin | |
| 4,996,642 A | 2/1991 | Hey | |
| 5,091,852 A | 2/1992 | Tsuchida et al. | |
| 5,175,766 A * | 12/1992 | Hamilton | 705/71 |
| 5,201,010 A | 4/1993 | Deaton et al. | |
| 5,311,424 A | 5/1994 | Mukherjee et al. | |
| 5,353,219 A | 10/1994 | Mueller et al. | |
| 5,383,111 A | 1/1995 | Homma et al. | |
| 5,459,306 A | 10/1995 | Stein et al. | |
| 5,515,269 A | 5/1996 | Willis et al. | |
| 5,583,763 A | 12/1996 | Atcheson et al. | |
| 5,668,987 A | 9/1997 | Schneider | |
| 5,704,017 A | 12/1997 | Heckerman et al. | |
| 5,749,081 A | 5/1998 | Whiteis | |
| 5,768,142 A | 6/1998 | Jacobs | |
| 5,774,868 A | 6/1998 | Cragun et al. | |
| 5,790,426 A | 8/1998 | Robinson | |
| 5,794,209 A | 8/1998 | Agrawal et al. | |
| 5,825,651 A | 10/1998 | Gupta et al. | |
| 5,835,087 A | 11/1998 | Herz et al. | |
| 5,842,199 A | 11/1998 | Miller et al. | |

(Continued)

FOREIGN PATENT DOCUMENTS

EP  0 265 083  4/1988

(Continued)

OTHER PUBLICATIONS

Aronson, Brad and Zeff, Robbin, "Advertising on the Internet," Online, http://library.books24x7.com, visited May 16, 2002, Copyright 1999, Chapters 3 and 6.

(Continued)

*Primary Examiner*—Thu Thao Havan
(74) *Attorney, Agent, or Firm*—Finnegan, Henderson, Farabow, Garrett and Dunner, L.L.P.

(57) ABSTRACT

Methods and systems consistent with the present invention allow users with a universal resource locator and code to access a web site. Once the code is accepted, the user has the ability to view one or more offers which he can then accept or reject. If the user accepts an offer, his account can be automatically created or updated. Further, any information regarding the user's viewing history can be saved. The user's viewing history can then be analyzed to determine the effectiveness of the offer wherein the offer can be modified to entice users to accept more offers.

52 Claims, 18 Drawing Sheets

U.S. PATENT DOCUMENTS

| | | | | |
|---|---|---|---|---|
| 5,850,442 | A * | 12/1998 | Muftic | 705/65 |
| 5,867,799 | A | 2/1999 | Lang et al. | |
| 5,872,850 | A | 2/1999 | Klein et al. | |
| 5,878,384 | A | 3/1999 | Johnson et al. | |
| 5,884,282 | A | 3/1999 | Robinson | |
| 5,893,909 | A | 4/1999 | Nomura et al. | |
| 5,918,014 | A | 6/1999 | Robinson | |
| 5,933,811 | A | 8/1999 | Angles et al. | |
| 5,948,061 | A | 9/1999 | Merriman et al. | |
| 5,949,419 | A | 9/1999 | Domine et al. | |
| 5,974,396 | A | 10/1999 | Anderson et al. | |
| 6,006,218 | A | 12/1999 | Breese et al. | |
| 6,006,225 | A | 12/1999 | Bowman et al. | |
| 6,016,475 | A | 1/2000 | Miller et al. | |
| 6,018,738 | A | 1/2000 | Breese et al. | |
| 6,018,748 | A | 1/2000 | Smith | |
| 6,029,195 | A * | 2/2000 | Herz | 709/219 |
| 6,038,598 | A | 3/2000 | Danneels | |
| 6,041,311 | A | 3/2000 | Chislenko et al. | |
| 6,049,777 | A | 4/2000 | Sheena et al. | |
| 6,061,660 | A * | 5/2000 | Eggleston et al. | 705/14 |
| 6,064,980 | A | 5/2000 | Jacobi et al. | |
| 6,085,229 | A | 7/2000 | Newman et al. | |
| 6,092,049 | A | 7/2000 | Chislenko et al. | |
| 6,108,493 | A | 8/2000 | Miller et al. | |
| 6,112,186 | A | 8/2000 | Bergh et al. | |
| 6,119,101 | A | 9/2000 | Peckover | |
| 6,226,656 | B1 | 5/2001 | Zawadski et al. | |
| 6,236,972 | B1 | 5/2001 | Shkedy | |
| 6,266,649 | B1 | 7/2001 | Linden et al. | |
| 6,285,987 | B1 | 9/2001 | Roth et al. | |
| 6,286,043 | B1 | 9/2001 | Cuomo et al. | |
| 6,317,722 | B1 | 11/2001 | Jacobi et al. | |
| 6,317,782 | B1 | 11/2001 | Himmel et al. | |
| 6,321,179 | B1 | 11/2001 | Glance et al. | |
| 6,321,221 | B1 | 11/2001 | Bieganski | |
| 6,334,127 | B1 | 12/2001 | Bieganski et al. | |
| 6,356,889 | B1 | 3/2002 | Lohman et al. | |
| 6,401,075 | B1 | 6/2002 | Mason et al. | |
| 6,401,085 | B1 * | 6/2002 | Gershman et al. | 707/4 |
| 6,412,012 | B1 | 6/2002 | Bieganski et al. | |
| 6,415,368 | B1 | 7/2002 | Glance et al. | |
| 6,438,579 | B1 | 8/2002 | Hosken | |
| 6,442,529 | B1 | 8/2002 | Krishan et al. | |
| 6,446,076 | B1 * | 9/2002 | Burkey et al. | 707/102 |
| 6,460,036 | B1 | 10/2002 | Herz | |
| 6,609,108 | B1 * | 8/2003 | Pulliam et al. | 705/27 |
| 6,643,696 | B2 | 11/2003 | Davis et al. | |
| 6,654,726 | B1 * | 11/2003 | Hanzek | 705/26 |
| 2002/0010757 | A1 | 1/2002 | Granik et al. | |
| 2002/0019774 | A1 | 2/2002 | Kanter | |
| 2002/0032608 | A1 | 3/2002 | Kanter | |
| 2002/0161779 | A1 * | 10/2002 | Brierley et al. | 707/103 R |

FOREIGN PATENT DOCUMENTS

| | | |
|---|---|---|
| EP | 0 643 359 | 3/1995 |
| EP | 0 751 471 | 1/1997 |
| EP | 0 827 063 | 3/1998 |
| GB | 2 336 925 | 11/1999 |
| JP | 1-169605 | 7/1989 |
| WO | WO 97/26729 | 7/1997 |
| WO | WO 98/02835 | 1/1998 |
| WO | WO 98/33135 | 7/1998 |
| WO | WO 99/13423 | 3/1999 |
| WO | WO 00/68851 | 11/2000 |

OTHER PUBLICATIONS

Matthias Jarke et al., "Query Optimization in Database Systems," Computing Surveys, vol. 16, No. 2, Jun. 1984, pp. 111-152.

Gerard Salton et al., "Term-Weighting Approaches in Automatic Text Retrieval," Information Processing & Management, vol. 24, No. 5, Jan. 1988, pp. 513-523.

John A. Swets, "Measuring the Accuracy of Diagnostic Systems," Articles, Science, vol. 240, Jun. 3, 1988, pp. 1285-1293.

Nicholas J. Belkin et al., "Information Filtering and Information Retrieval: Two Sides of the Same Coin?," Communications of the ACM, vol. 35, No. 12, Dec. 1992, pp. 29-38.

Earl Cox, "How a Machine Reasons: Part 8," AI Expert, vol. 8, No. 3, Mar. 1993, pp. 13-14.

David A. Maltz, "Distributing Information for Collaborative Filtering on Usenet Net News," Department of Electrical Engineering and Computer Science, Massachusetts Institute of Technology, May 1994, pp. 1-78.

Pattie Maes, "Agents that Reduce Work and Information Overload," Communications of the ACM, vol. 37, No. 7, Jul. 1994, pp. 31-40 and 146.

M.W. Berry et al., "Using Linear Algebra for Intelligent Information Retrieval," Department of Computer Science, University of Tennessee, Knoxville, TN, Information Science Research Group, Bellcore, Morristown, NJ, Dec. 1994, pp. 1-24.

Paul Resnick et al., "GroupLens: An Open Architecture for Collaborative Filtering of Netnews," CSCW, 1994, pp. 175-186.

Upendra Shardanand et al., "Social Information Filtering: Algorithms for Automating 'Word of Mouth'," Chi '95 Conference Proceedings on Human Factors in Computing Systems, May 7-11, 1995, pp. 210-217.

Pat Langley et al., Applications of Machine Learning and Rule Induction,: Communications of the ACM, vol. 38, No. 11, Nov. 1995, pp. 54-64.

Curtis H.K. Tsang et al., "An Object Oriented Intelligent Tourist Advisor System," Proc. 1996 Australian New Zealand Conf. on Intelligent Information Systems, Adelaide, Australia, Nov. 18-20, 1996, pp. 1-4.

Net Perceptions, Inc., White Paper, "Building Customer Loyalty and High-Yield Relationships Through GroupLens™," http://www.netperceptions.com/whitepaper.html, (Visited Nov. 22, 1996), pp. 1-9.

Paul Resnick et al., "Recommender Systems," Communications of the ACM, vol. 40, No. 3, Mar. 1997, pp. 56-58.

Loren Terveen et al., "Phoaks: A System for Sharing Recommendations," Communications of the ACM, vol. 40, No. 3, Mar. 1997, pp. 59-62.

Henry Kautz et al., "Referral Web: Combining Social Networks and Collaborative Filtering," Communications of the ACM, vol. 40, No. 3, Mar. 1997, pp. 63-65.

Marko Balabanović et al., "Fab: Content-Based, Collaborative Recommendation," Communications of the ACM, vol. 40, No. 3, Mar. 1997, pp. 66-72.

James Rucker et al., "Siteseer: Personalized Navigation for the Web," Communications of the ACM, vol. 40, No. 3, Mar. 1997, pp. 73-76.

Joseph A. Konstan et al., "GroupLens: Applying Collaborative Filtering to Usenet News," Communications of the ACM, vol. 40, No. 3, Mar. 1997, pp. 77-87.

Christopher Avery et al., "Recommender Systems for Evaluating Computer Messages," Communications of the ACM, vol. 40, No. 3, Mar. 1997, pp. 88-89.

Henry Lieberman, "Autonomous Interface Agents," Papers, Chi 97, Mar. 22-27, 1997, pp. 67-74.

Richard V. Dragan et al., "Advice from the Web," PC Magazine, vol. 16, No. 15, Sep. 1997, pp. 133-137.

Paul McJones et al., "Each to Each Programmer's Reference Manual," SRC Technical Note, Oct. 1997, pp. 1-16.

Chris Locke, "Intelligent Agents Create Dumb Users (?)," Online & CDROM Review, vol. 21, No. 6, 1997, pp. 369-372.

Bradley N. Miller et al., "Experiences with GroupLens: Making Usenet Useful Again," Usenix Association, Annual Technical Conference, 1997, pp. 219-233.

Al Borchers et al., "Ganging up on Information Overload," Computer, Apr. 1998, pp. 106-108.

Stefania Montani et al., "A Case-Based Retrieval System for Diabetic Patients Therapy," Proceedings on the Third International Conference on Neural Networks and Expert Systems in Medicine Healthcare, Pisa, Italy, Sep. 2-4, 1998, pp. 160-168.

John S. Breese et al., "Empirical Analysis of Predictive Algorithms for Collaborative Filtering," Technical Report MSR-TR-98-12, Microsoft Research, Redmond, WA, Oct. 1998, pp. 1-20.

Marc Johnson et al., "Direct E-mail: Winning Long-term Consumer Attention," Jupiter Communications, Dec. 1998, pp. 1-26.

Badrul M. Sarwar et al., "Using Filtering Agents to Improve Prediction Quality in the GroupLens Research Collaborative Filtering System," CSCW, 1998, pp. 345-354.

Chumki Basu et al., "Recommendation as Classification: Using Social and Content-Based Information in Recommendation," American Association for Artificial Intelligence, 1998, pp. 714-720.

Gary Boone, "Concept Features in Re:Agent, an Intelligent Email Agent," Autonomous Agents, 1998, pp. 141-148.

Jonathan L. Herlocker et al., "An Algorithmic Framework for Performing Collaborative Filtering," Dept. of Computer Science and Engineering, University of Minnesota, 1999, pp. 1-8.

Nathaniel Good et al., "Combining Collaborative Filtering with Personal Agents for Better Recommendations," American Association for Artificial Intelligence, 1999, pp. 1-8.

Robert O'Harrow Jr., "Private or Not?," Washington Post, http://www.washingtonpost.com/cgi-bin/gx.cgi/AppL, May 17, 2000, (Visited Jun. 13, 2000), pp. 1-4.

Susan Stellin, "Internet Companies Learn How to Personalize Service," E-Commerce Report, Aug. 2000, http://www.nytimes.com/library/tech/00/08/cyber/commerce/28commerce.html, (Visited Aug. 28, 2000), pp. 1-5.

George Karypis, "Suggest: Top-N Recommendation Engine Version 1.0," University of Minnesota, Department of Computer Science/Army HPC Research Center, Minneapolis, MN, Nov. 2000, pp. 1-11.

Ming C. Hao et al., "Visualization of Directed Association in E-Commerce Transaction Data," Department of Computer Science, Swiss Federal Institute of Technology, Zurich, Switzerland, Dec. 2000, pp. 1-7.

Badrul Sarwar et al., "Item-based Collaborative Filtering Recommendation Algorithms," WWW10, May 1-5, 2001, Hong Kong, pp. 1-15.

Luis Mateus Rocha, "Adaptive Recommendation and Open-Ended Semiosis," Kybernetes, vol. 30, No. 5-6, 2001, pp. 1-28.

"Imagine: Extracting Knowledge from Large Collections," http://teefix.fernuni hagen.de/~ferber/imagine/, (Visited Jan. 3, 2002), pp. 1-2.

"Imagine: Interaction Merger for Associations Gained by Inspection of Numerous Exemplars," http://teefix.fernuni-hagen.de/~ferber/imagine/imagine-info-engl.html, (Visited Jan. 3, 2002), pp. 1-4.

George Karypis, "Evaluation of the Item-Based Top-N Recommendation Algorithms." University of Minnesota—Computer Science and Engineering, Sep. 2000, https://wwws.cs.umm.edu/techreports/listing/list-report.cgi, (Visited Feb. 4, 2003), pp. 1-14.

J. Ben Schafer et al., "Recommender Systems in E-Commerce," Department of Computer Science and Engineering, University of Minnesota, Minneapolis, MN, pp. 1-9.

Andreas Geyer-Schulz et al., "A Customer Purchase Incidence Model Applied to Recommender Services," pp. 1-11.

Elias N. Houstis et al., "PYTHIA-II: A Knowledge/Database System for Managing Performance Data and Recommending Scientific Software," Dept. of Computer Sciences, Purdue University, West Lafayette, IN, College of Information Science & Tech., Drexel University, Philadelphia, PA, Dept. Of Computer Science, Virginia Tech, Blacksburg, VA, and Dept. of Computer Science, University of Crete, Heraklion, Greece, pp. 1-24.

Kwok-Wai Cheung et al., "Mining Customer Product Ratings for Personalized Marketing," Department of Computer Science, Hong Kong Baptist University, Kowloon Tong, Hong Kong, and Department of Computer Science, Hong Kong University of Science and Technology, Clear Water Bay, Hong Kong, pp. 1-21.

Olfa Nasraoui et al., "Mining Web Access Logs Using Relational Competitive Fuzzy Clustering," pp. 1-5.

John Canny, "Collaborative Filtering with Privacy via Factor Analysis," Computer Science Division, University of California, Berkeley, CA, pp. 1-8.

David Maltz et al., "Pointing the way: active collaborative filtering," Dept. of Computer Science, Carnegie-Mellon University, Pittsburgh, PA and Lotus Development Corporation, Cambridge, MA, pp. 1-11.

Christos Faloutsos et al., "A Survey of Information Retrieval and Filtering," University of Maryland, College Park, MD, pp. 1-22.

William W. Cohen, "Fast Effective Rule Induction," AT&T Bell Laboratories, Murray Hill, NJ, pp. 1-9.

Will Hill et al., "Recommending and Evaluating Choices in a Virtual Community of Use," Bellcore, Morristown, NJ, pp. 1-12.

William W. Cohen, "Learning Rules that Classify E-Mail," AT&T Laboratories, Murray Hill, NJ, pp. 1 8.

C.E. Unterberg, Towbin, "Beyond the Banner: the birth of email marketing," pp. 1-72.

Anupam Joshi et al., "Robust Fuzzy Clustering Methods to Support Web Mining," Department of Computer Engineering and Computer Science, University of Missouri, Columbia, MO and Department of Mathematical and Computer Sciences, Colorado School of Mines, Golden, CO, pp. 1-9.

Net Perceptions: GroupLens Toolkit, http://web.archive.org/web/19970418053016/www.netperceptions.com/product.html (Visited Dec. 8, 2003), pp. 1-2.

Net Perceptions: Company Overview, http://web.archive.org/web/19970418053001/www.netperceptions.com/company.html (Visited Dec. 8, 2003), pp. 1-2.

"Home Box Office Selects Like Minds Personalization Software for Second Network Site," PR Newswire, Nov. 17, 1997.

"Net Perceptions Closes Second Round of Financing; GroupLens secures No. 1 recommendation system spot with strong endorsement by investment community," Business Wire, Mar. 2, 1998.

"Net Perceptions Debuts GroupLens Version 3.0 at Internet World Spring; 'Industrial Strength Tool Matures Into Essential Website Technology,'" 'Business Wire, Mar. 9, 1998.

"Fort Point Partners Teams With Like Minds to Offer Breakthrough Personalization Technology for Increased Sales Online," Business Wire, Mar. 11, 1998.

"LinkShare Launches Affiliates Profiling Software; First to Integrate Personalization Software Into Affiliates Program," PR Newswire Association Inc., Feb. 24, 2998.

"GroupLens Recommendation Engine to Standardize Internet Personalization For Singapore's Online Technologies Consortium," Business Wire, Jun. 17, 1998.

Net Perceptions, "Investor Information," http://www.corporate-ir.net/ireye/ir_site.zhtml?ticker=NETP&script=410&layout=6&item (Visited Dec. 2, 2002), pp. 1-2.

"Net Perceptions Launches Comprehensive Hosted Marketing Services for eRetailers," http://biz.yahoo.com/bw/000712/mm_net_per.html (Visited Jul. 12, 2000), pp. 1-3.

* cited by examiner

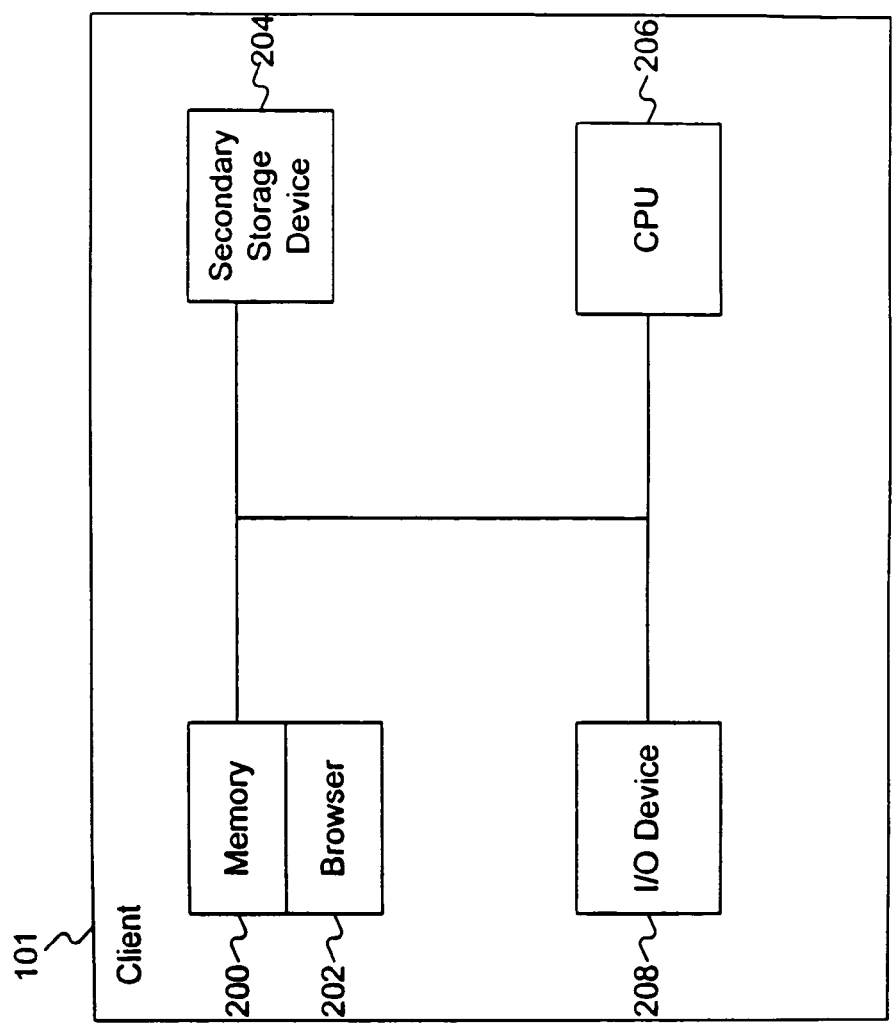

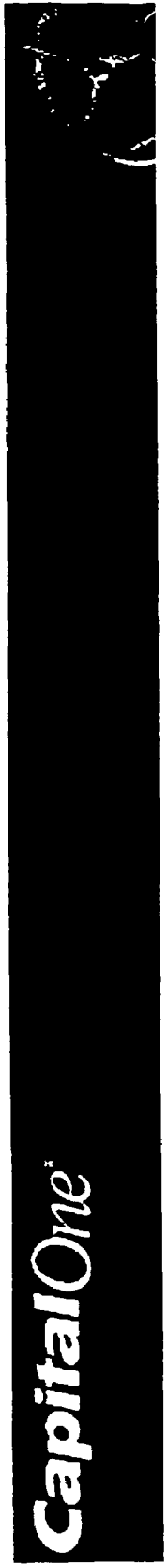

Thank you. We have already received your online response to this promotion. We look forward to serving you now and in the future, as we continue to provide opportunities to meet your changing needs.

Access Your Account Online
For Capital One online account information, go to http://www.capitalone.com/ where you can view your most recent statements, view recent transactions, pay your credit card bill online and download your statement information.

100% FRAUD PROTECTION

Privacy
Security
Terms of Use

FIG. 11

CapitalOne®

Thank you for your interest in this offer. In order for us to process your request, you must read and accept the statement below.

I authorize Capital One to begin reducing my Annual Membership Fee as described in this offer, effective the next time my account is renewed. I understand that a membership fee may be assessed if I accept an upgrade to my account.

Capital One customers can now take advantage of all the great benefits and special offers we have available. New offers are announced on a regular basis. Please provide us with your e-mail address so you don't miss out!

E-mail Address [_____]

[ I ACCEPT ]  [ NO THANKS ]

This offer expires on 06/14/2000

FIG. 13

SOLICITATION TO WEB MARKETING LOOP PROCESS

BACKGROUND OF THE INVENTION

A. Field of the Invention

The present invention relates generally to providing solicitations for offers and, more particularly, to a network that provides systems, apparatus, and methods for maintaining offers on a network and for permitting users to access and respond to the offers.

B. Description of the Prior Art

Advertising often takes a two-stage approach, applying marketing techniques in a solicitation and again, at a point of sale. The point of sale that a solicitation drives a customer to, for example, may be a store, a telemarketing center, or a web site on the Internet. Today, there is usually little connection between marketing done at the point of sale and the reasons why the company solicited a given customer. Physical stores cannot change to adapt their marketing approach when a customer arrives. A telemarketing center can adapt somewhat to meet a particular customer's needs, but is much less flexible than the Internet. Only the Internet has the potential to customize the experience of visiting a point of sale.

Some web sites today provide a custom experience for the user. This customization often depends on the user's previous visits. However, today's web sites do not base their customization on a solicitation. That is to say, today's web sites to do not complete the loop from a solicitation to web-based marketing.

Further, some web sites today provide offers on their web site. However, these offers are directed to the general public. They are not directed to specific individuals. Additionally, these offers are not provided in response to a solicitation received by a select group of individuals.

As such, a system is needed to provide solicitations and offers to potential or existing customers through the Internet. Further, a system is needed to allow these existing or potential customers to respond to these solicitations and offers through the Internet, thus tying together the solicitation and point of sale phases of marketing.

SUMMARY OF THE INVENTION

To overcome the limitations of existing techniques to provide solicitations and offers, and in accordance with the purpose of the invention, as embodied and broadly described herein, methods and systems consistent with the invention include a method for providing web-based solicitations and corresponding responses, including providing a solicitation to a set of recipients sharing pre-selected characteristics, incorporating in the solicitation a code and a universal resource locator (URL) corresponding to a web site; receiving a request to access the web site with the code; providing an offer corresponding to the code; and receiving responses to the offer.

Another embodiment of the present invention, as embodied and broadly described herein provides for a system and method for accessing web-based solicitations including receiving a solicitation with a code and a universal resource locator (URL) corresponding to a web site; accessing a web page through the URL and the code; receiving an offer based on the code; and providing a response to the offer at the web page.

It is to be understood that both the foregoing general description and the following detailed description are exemplary and explanatory only and are not restrictive of the invention, as claimed. Advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate an implementation of the invention and, together with the description, explain the goals, advantages and principles of the invention. In the drawings.

FIG. 2 is an exemplary block diagram of the main components of a client server consistent with the present invention;

FIG. 11 is an exemplary pictorial diagram of a view presented to a user when the user when the web site is first accessed and the user has previously responded to the offer consistent with the present invention;

FIG. 13. is an exemplary pictorial diagram of a view presented to a user when an offer is being provided consistent with the present invention;

DETAILED DESCRIPTION

Reference will now be made in detail to an implementation consistent with the present invention. Wherever possible, the same reference numbers will be used throughout the drawings to refer to the same or like parts.

Overview

Methods and systems consistent with the present invention overcome the shortcomings of conventional systems by providing for solicitations to be offered based on a user's characteristics and allowing users to access and accept offers through a web site. The system generally provides for evaluating a user's characteristics, generating and sending to the user a solicitation incorporating a code and a universal resource locator (URL), allowing the user to access the web site by using the URL and enter the code incorporated in the solicitation, review offers corresponding to the code, and receiving responses related to the offers.

System

Figure 1A:
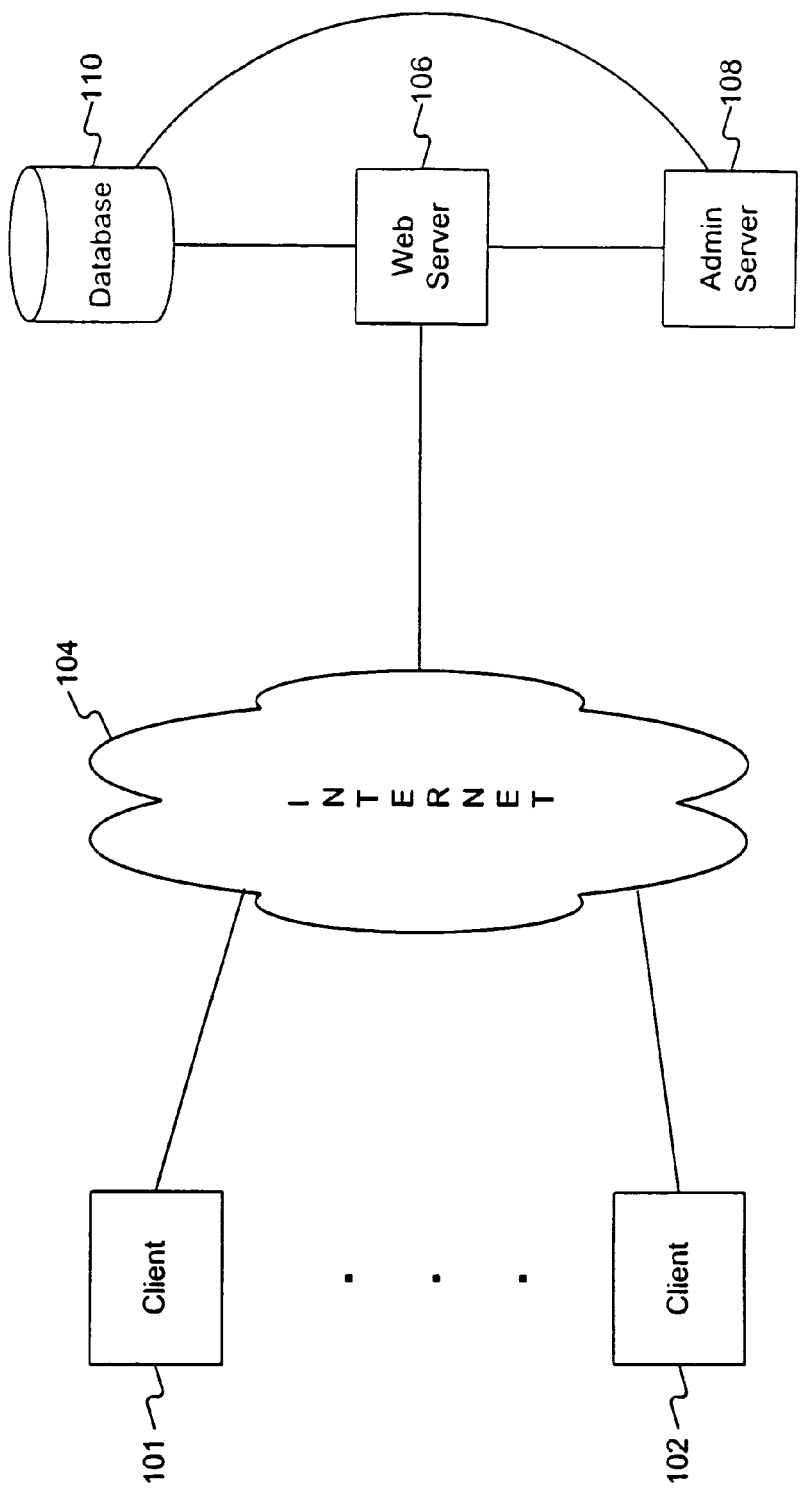
FIG. 1A is an exemplary pictorial diagram of a computer network in which systems consistent with the present invention may be implemented.

FIG. 1A depicts a computer network system in which systems consistent with the present invention may be implemented. System 100 includes clients 101 and 102, Internet 104, web server 106, Administration server 108 and database 110. Clients 101 and 101 are typically users and are connected to a network, e.g. the Internet 104. Web server 106 is also connected to Internet 104 wherein clients 101 and 102 can access web server 106. It can be appreciated by one of ordinary skill in the art that clients 101 and 102 can denote a single client or can be many clients. Through web server 106, clients 101 and 102 can access offers contained in database 110. Administration server 108 is an Administration server and can access web server 106 and database 110 directly. The system also contains database 110 with access from web server 106 and Administration server 108. Database 110 may contain the offers the users receive upon access to the web site. Database 110 is maintained by Administration server 108.

Figure 1B:
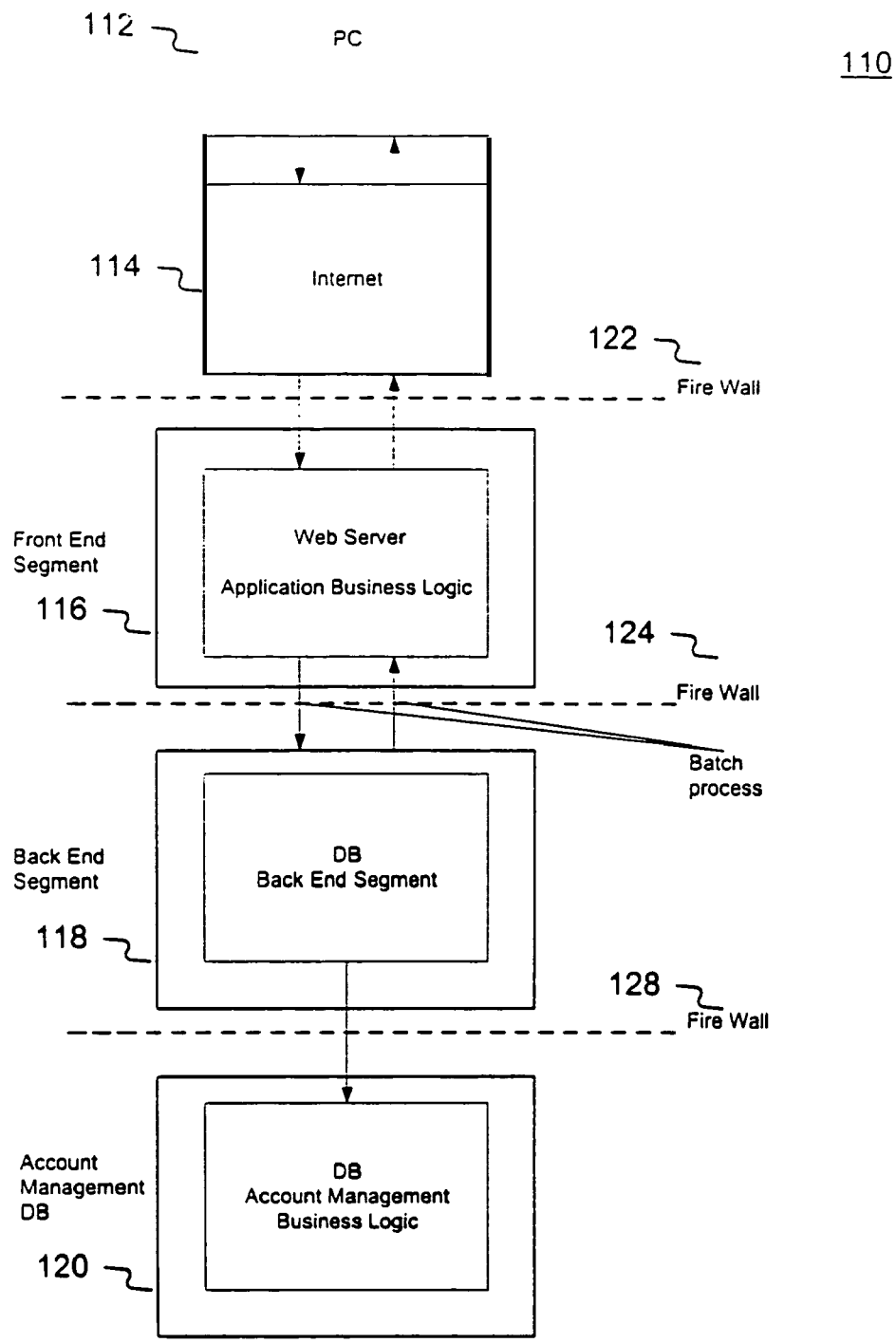
FIG. 1B is an alternate diagram of a computer network in which systems consistent with the present invention may be implemented.

FIG. 1B depicts an alternate system in which systems consistent with the present invention may be implemented. System 110 contains personal computer 112, Internet 114, Web server 116, database 118 and database 120. Personal computer 112 is connected to Internet 114. It can be appreciated by one or ordinary skill in the art that personal computer 112 can be a single user or multiple users. Personal computer 112, through Internet 114, accesses Web server 116. Web server 116 contains the application business logic representing the front end segment of the system. Web server 116 connects to database 118 representing the back end segment. Database 118 is connected to database 120 containing the account management business logic. Firewall 112 may be implemented between Internet 114 and Web server 116. Firewall 124 may be implemented between Web server 116 and Database 118. Firewall 128 may be implemented between database 118 and database 120.

FIG. 2 depicts the hardware configuration of client 101 consistent with the present invention. It can be appreciated that the configuration of client 101 can be the same for all the clients on the Internet 104. Client 101 comprises memory 200, browser 202, secondary storage device 204, central processing unit 206 and input/output device 208. A user can access, through input/output device 208 browser 202 which enables access to Internet 104 and subsequent access to web server 106.

Figure 3:
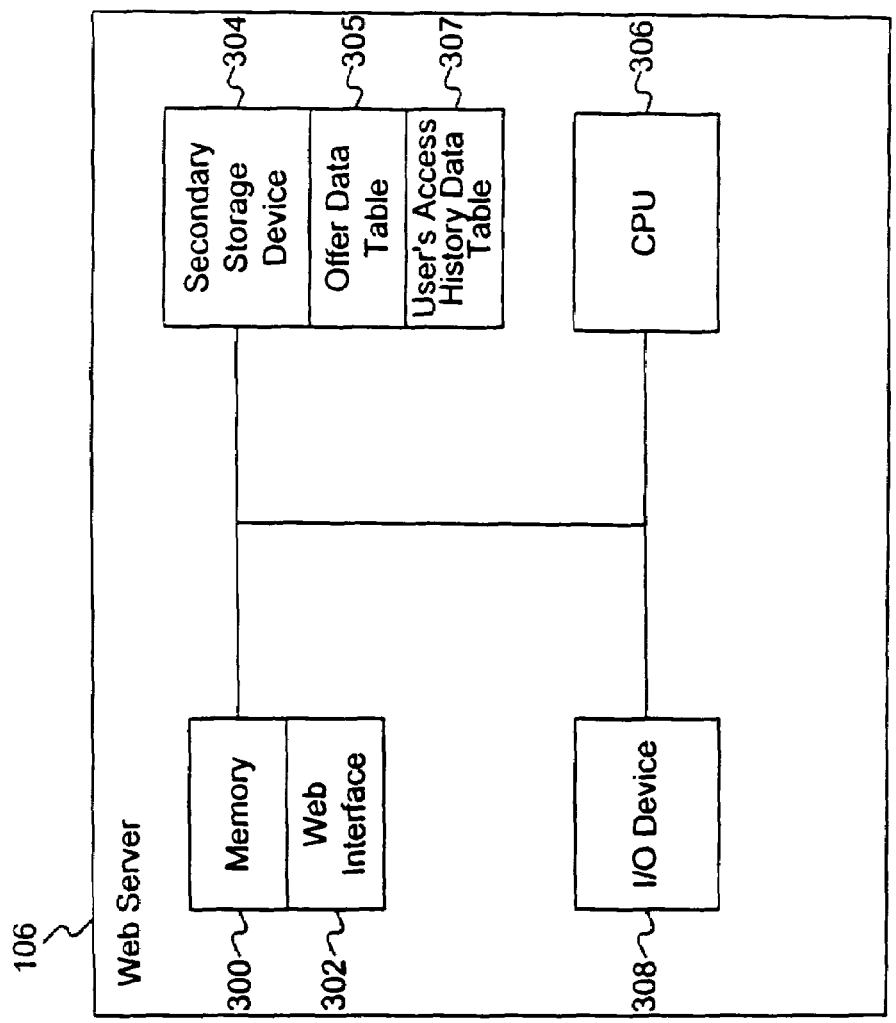
FIG. 3 is an exemplary block diagram of the main components of a web server consistent with the present invention.

FIG. 3 depicts the hardware configuration of web server 106 consistent with the present invention. Web server 106 comprises memory 300 and web interface 302. Secondary storage device 304 contains offer data table 305, central processing unit 306 and user's access history data table. Web server 106 also contains input/output device 308. Web server 106 receives access from client 101 at web interface 302. Web server 106 can then access offers at database 110, or offers stored in Administration server 108.

Figure 4A:
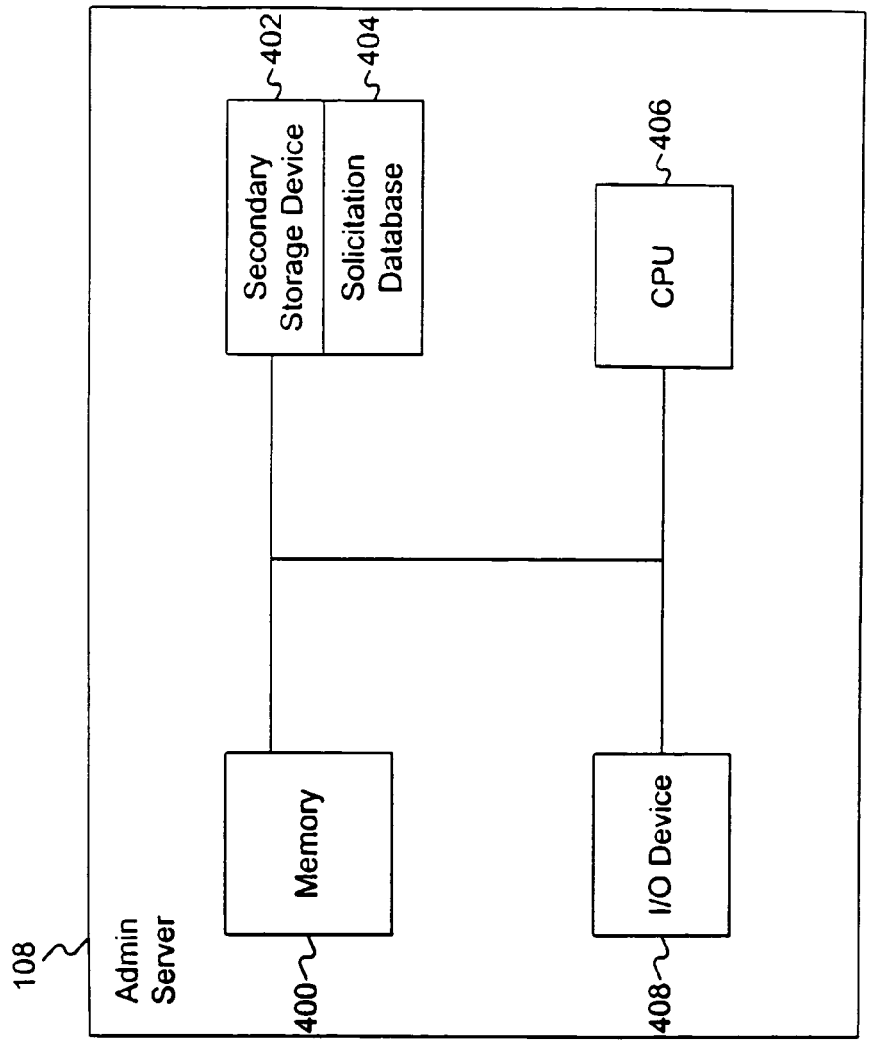
FIG. 4A is an exemplary block diagram of the main components of an administration server consistent with the present invention.

FIG. 4A, depicts the hardware configuration of Administration server 108 consistent with the present invention. Administration server 108 comprises memory 400, secondary storage device 402, central processing unit 406 and input/output device 408. Secondary storage device 402 contains solicitation database 404. Administration server 108 has access to database 110 as seen in FIG. 1A. Both solicitation database 404 and database 110 can store offers to be accessed by client 101.

Figure 4B:
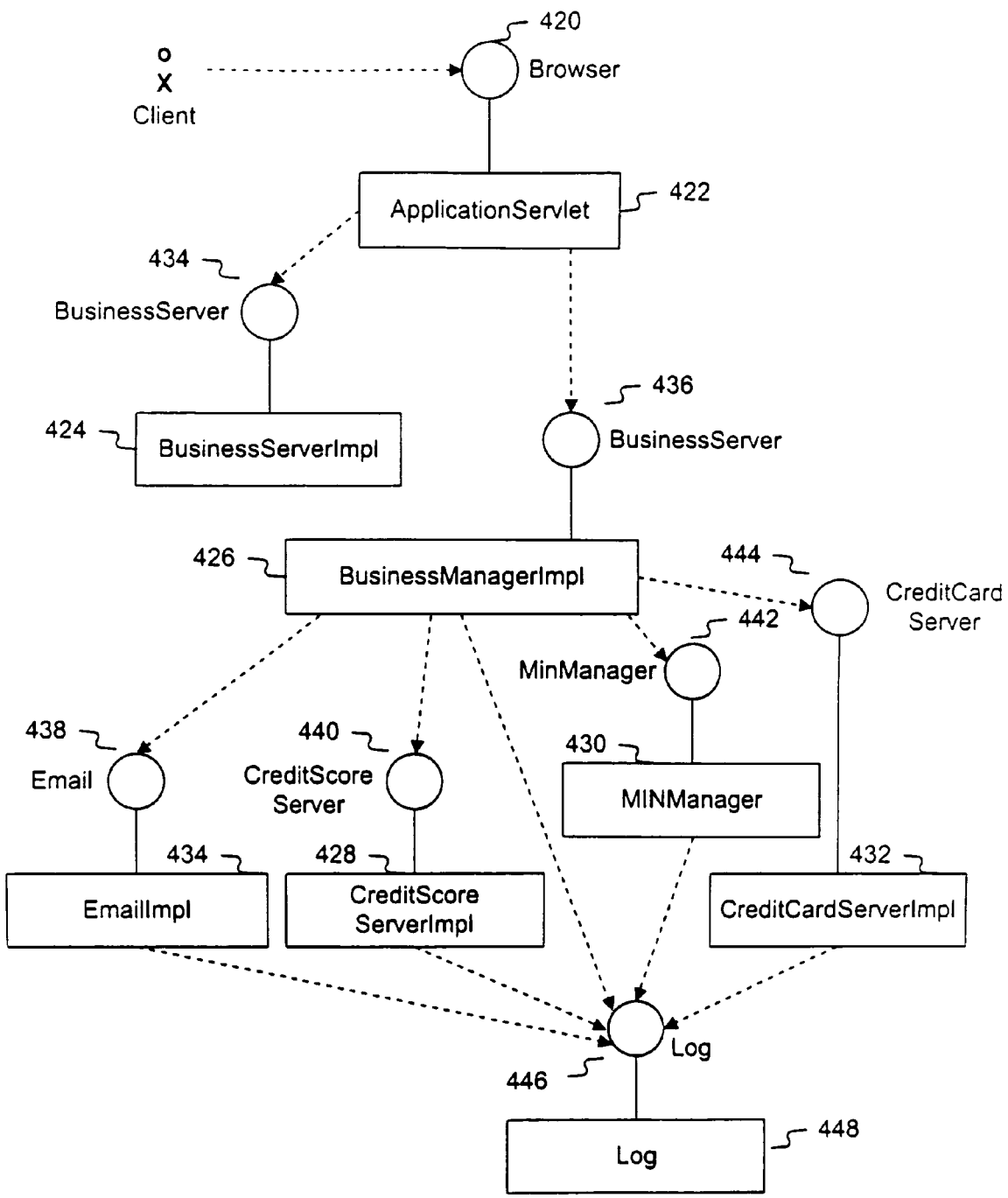
FIG. 4B is an exemplary block diagram of the configuration of a system consistent with the present invention.

FIG. 4B depicts a exemplary block diagram of the configuration of a system consistent with the present invention. It can be appreciated by one of ordinary skill in the art that the architecture can be configured in other formats to achieve the same results. A circle in the diagram indicates an interface. A dashed arrow shows a dependency on the interface. A rectangle indicates a class, and is linked to the interface it implements using a plain line. The system contains browser 420, ApplicationServlet 422, BusinessServerImpl 424, BusinessManagerImpl 426, CreditScoreserverImpl 428, MINManager 430, CreditCardServerImpl 432 and EmailImpl 434. The user utilizes browser 420 to access ApplicationServlet 422. ApplicationServlet 422 performs as a Java servlet. ApplicationServlet 422 interfaces with BusinessServerImpl 424 and BusinessManagerImpl 426. BusinessServerImpl 424 manages the top-level connection to services. BusinessManagerImpl defines the interaction sequence of the user with the business objects which walks the user through the solicitation session. CreditScoreServerImpl 428 performs a credit check and rates the credit for a customer to determine if credit can be extended to the user. MINManager 430 handles the selection of a phone number for a customer as set forth in one embodiment of the present invention. CreditCardServerImpl 432 handles charging services or merchandise to a customer's credit card. EmailImpl 434 handles sending e-mail to a customer summarizing and/or verifying any transactions performed at the web site.

BusinessServer 434 is the interface between Aplicationservlet 422 and BusinessServerImpl 424. BusinessServer 436 is the interface between ApplicationServlet 422 and BusinessManagerImpl 426. Email 438 is the interface between BusinessManagerImpl 426 and EmailImpl 434. CreditScoreServer 440 is the interface between BusinessManagerImpl 426 and CreditScoreServerImpl 428. MINManager 442 is the interface between BusinessManagerImpl 426 and MINManager 430. CreditCardServer 444 is the interface between BusinessManagerImpl 426 and CreditcardServerImpl 432. Log 446 is the interface between EmailImpl 434, CreditScoreServerImpl 428, MINManager 43C and CreditCardserverImpl 432 and Log 448.

Although aspects of the present invention are described as being stored in memory, one skilled in the art will appreciate that these aspects may be stored or read from other computer-readable media, such as secondary storage devices, like hard disks, floppy disks, and CD-ROM; a carrier wave received from a network; or other forms of ROM or RAM. Additionally, although specific components and programs of the system are depicted in FIG. 1, one skilled in the art will appreciate that these may contain additional or different components or programs.

The Solicitation Process

Figure 5:
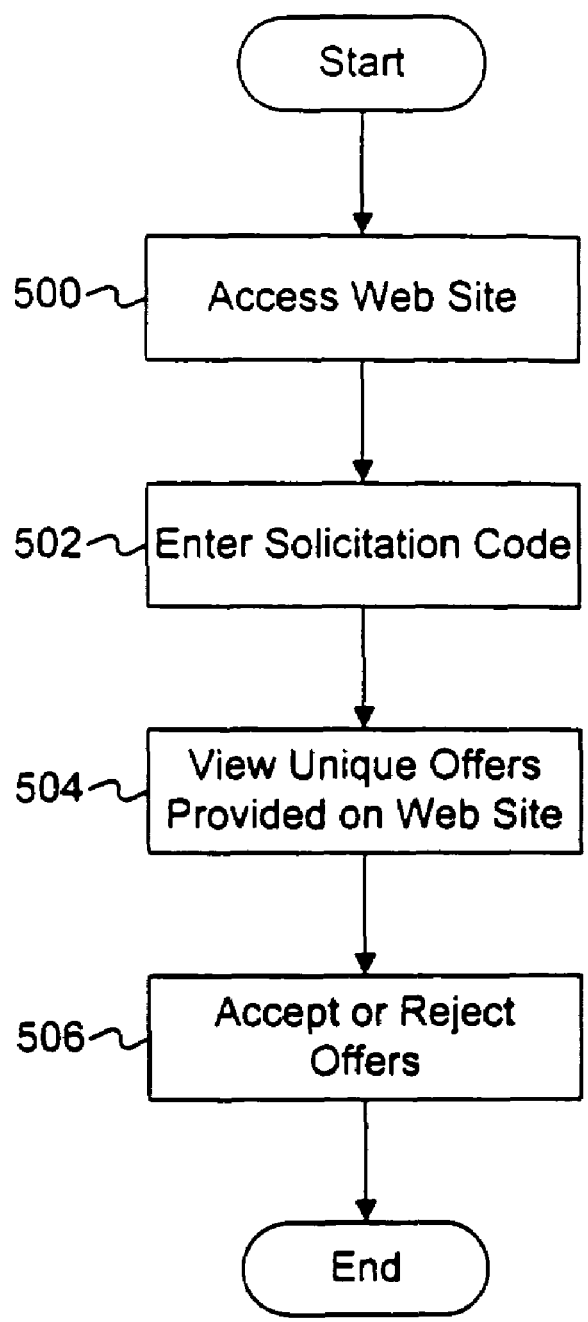
FIG. 5 depicts an exemplary flow chart of the general steps performed for providing web-based solicitations consistent with the present invention.

FIG. 5 depicts a flowchart for the overall process in the web solicitation marketing loop. After receiving a notification with a URL and possibly a promotion code, a user, either a potential new customer or a current customer, accesses the web site via the URL (step 500). The user would then, at a prompt, enter the code (step 502) wherein unique offers associated with the code are displayed. The user then has the opportunity to review an offer or a set of offers (step 504). This set of offers can related to any type of product or service. For example, the offers can relate to cellular telephone services, or credit card or other financial services. After the user has reviewed the offer, the user can then decide to either accept or reject the offer (step 506).

Figure 6:
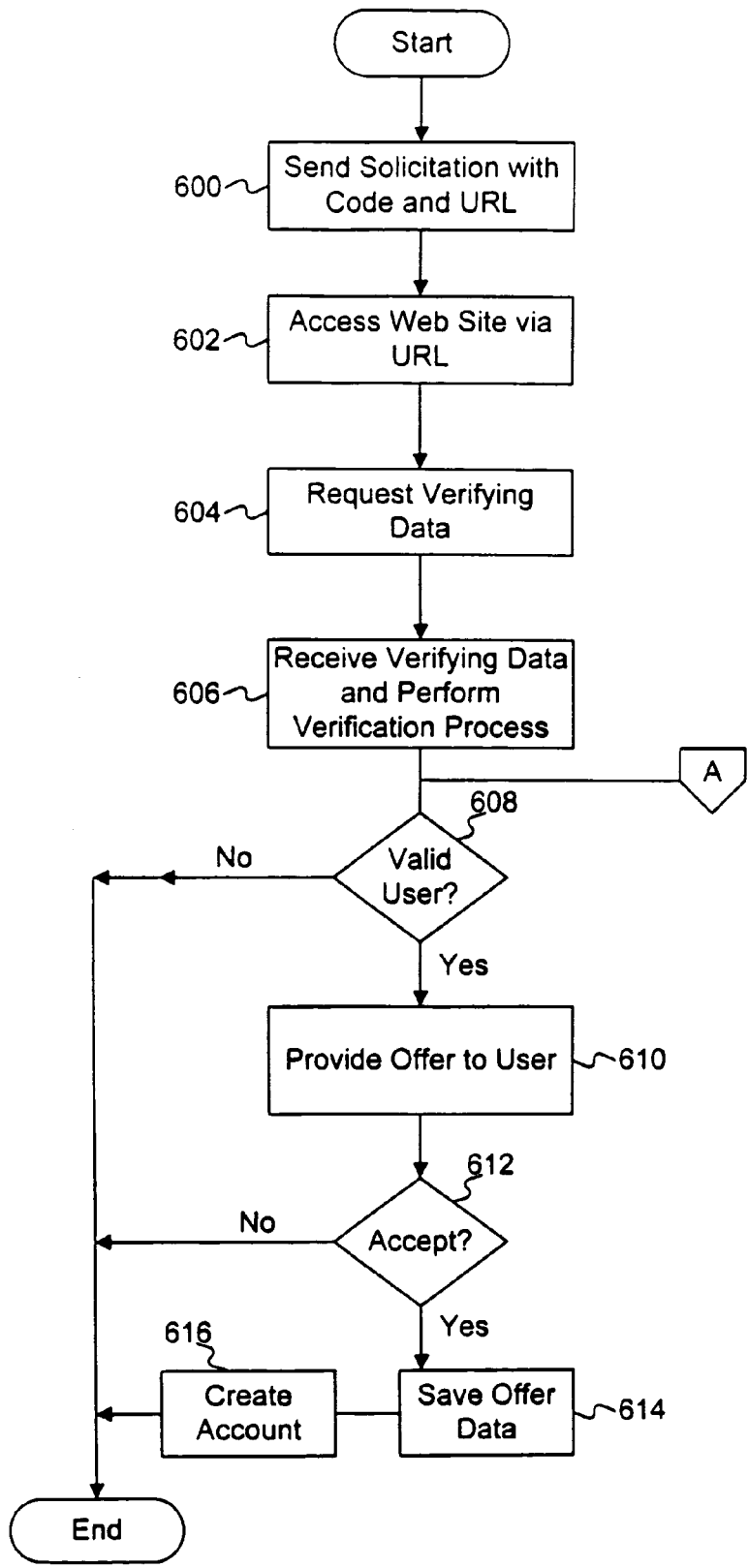
FIG. 6 depicts an exemplary flow chart of the specific steps performed for providing web-based solicitations consistent with the present invention.

FIG. 6 depicts a flowchart for the specific process in the web solicitation marketing loop for new customers. A set of recipients are selected by using a pre-determined set of characteristics. For example, these characteristics might include spending habits, credit history, or demographic data. A solicitation is then sent to the set of recipients wherein the solicitation includes a URL and a code (step 600). The solicitation could be sent through any means, for example, the U.S. Postal Service or through electronic means, i.e. an e-mail. A recipient, or user, would use the URL to access a web site on web server 106 (step 602). Once the web site was accessed, the user would see a prompt requesting verifying data (step 604). This verifying data could include the code contained in the solicitation, an address or zip code, a social security number, or any other type of verifying data that would be unique to the user. Web server 106 received this verifying data and verifies the information, either with the data contained in database 110, or with data contained in the Administration server 108 (step 606). A determination is then made as to whether the user is a valid user (step 608). If the user is not a valid user no access to the offer is provided. If the user is a valid user, the offer is displayed for the user to preview (step 610). The offer could include an invitation to apply for a credit card, or any other type of offer. The user then has the opportunity to accept or reject the offer (step 612). If the user accepts the offer, additional information is provided by the user which may include address information, social security number, or bank information. This information is then saved in data table 305 located on web server 106 (step 614). Additional checks may be done including checking the user's credit history with a credit bureau, i.e. the TRW credit bureau. The customer's account is then created with the information provided by the user either manually, or the account is automatically created on the Administration server 108 (step 616).

FIG. 7 depicts a flowchart for the specific process in the web solicitation marketing loop for an alternate embodiment of the present invention for existing customers. A set of recipients are selected by using a pre-determined set of characteristics. For example, these characteristics might include spending habits, transactional history, credit history, or demographic data. A solicitation is then sent to the set of recipients wherein the solicitation includes a URL and a code (step 700). The solicitation could be sent through the mail or through electronic means, i.e. an e-mail. A recipient, or user, would use the URL to access a web site on web server 106 (step 702). Once the web site was accessed, the user would see a prompt requesting verifying data (step 704). This verifying data could include the code contained in the solicitation, a customer account number, an address or zip code, a social security number, or any other type of verifying data that would be unique to the user. Web server 106 receives this verifying data and verifies the information, either with the data contained in database 110, or with data contained in the Administration server 108 (step 706). A determination is then made as to whether the user is a current customer (step 708). If the user is not a valid current customer, no access to the offer is provided. If the user is a valid current customer, the offer is displayed for the customer to preview (step 710). The offer could include a balance transfer, a reduced or no annual fee, a reduced interest rate on all or selected purchases, a reduced or no security deposit, or any combination thereof, or any other type of offer. The customer then has the opportunity to accept or reject the offer (step 712). If the customer accepts the offer, additional information may be provided by the customer. This information is then saved in data table 305 located on web server 106 (step 714). Additional checks may be done including checking the user's credit history with a credit bureau, i.e. the TRW credit bureau. The customer's account is then updated with the information provided by the customer either manually, or the account is automatically updated on the Administration server 108 (step 716).

Figure 7A:
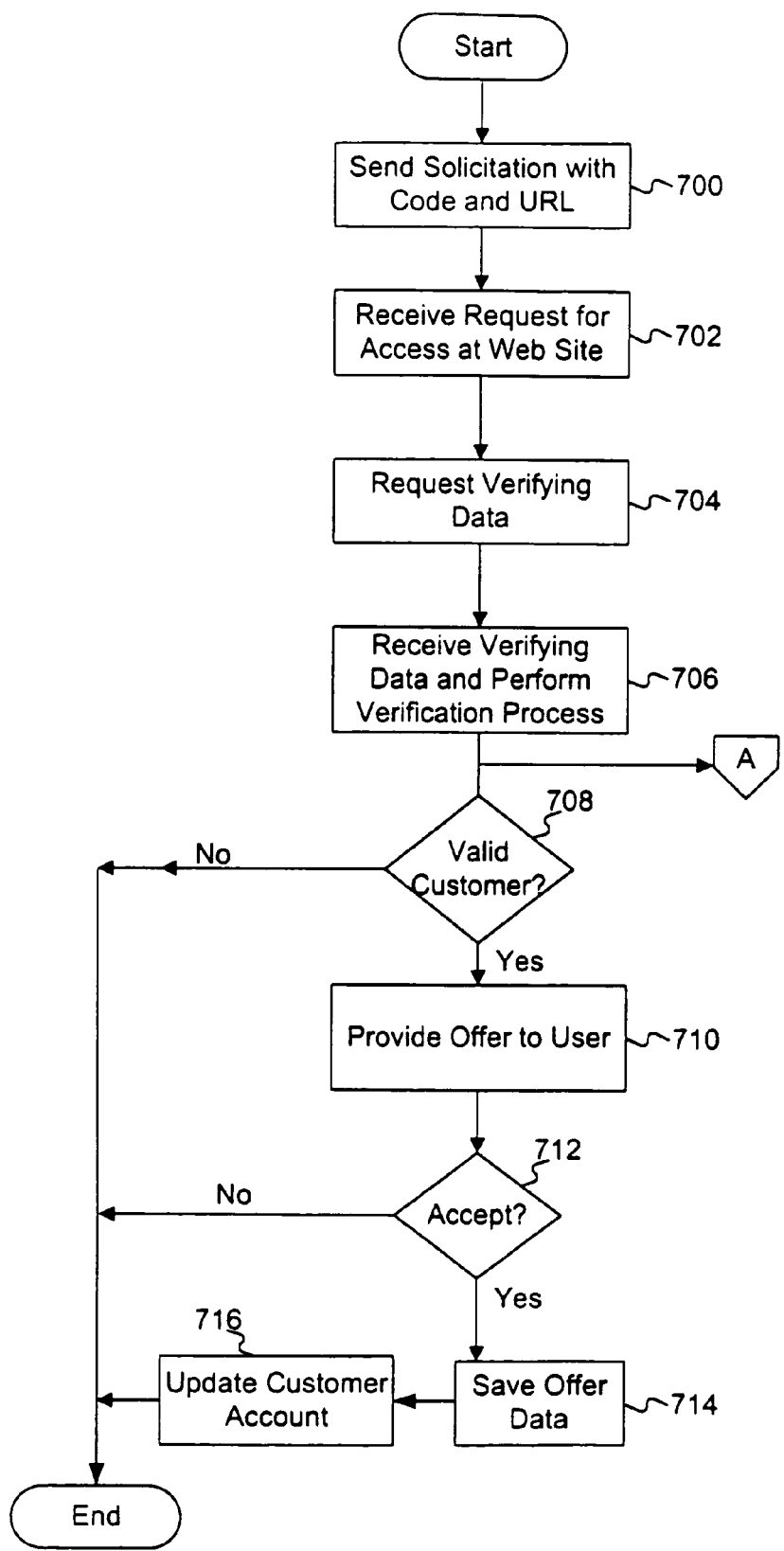
FIG. 7A depicts an exemplary flow chart of the specific steps performed for providing web-based solicitations of another embodiment consistent with the present invention.
Figure 7B:
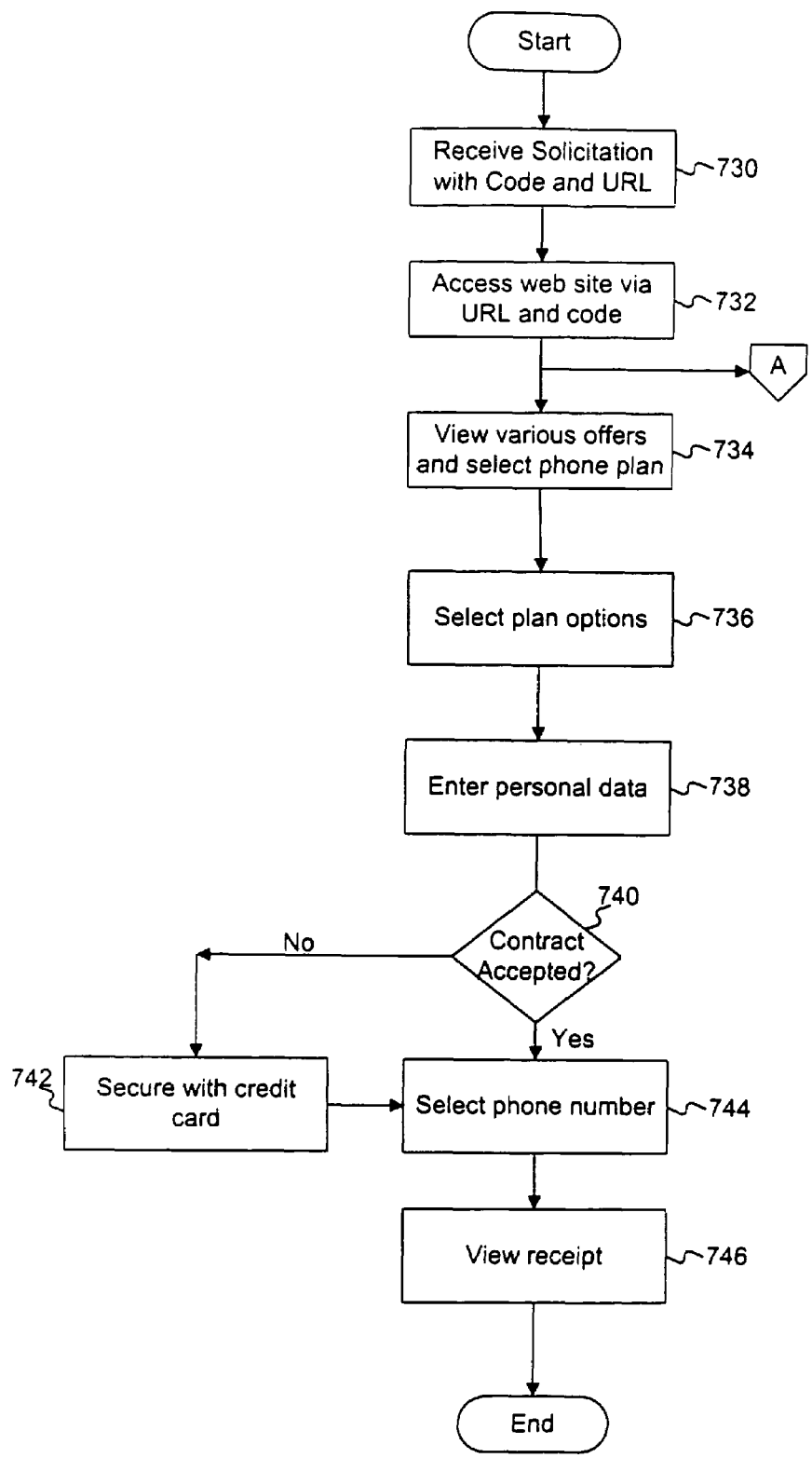
FIG. 7B depicts an exemplary flow chart of the specific steps performed for providing web-based solicitations of another embodiment consistent with the present invention.

FIG. 7A depicts a flowchart for an alternative exemplary embodiment wherein the user receives offers for phone plans. As in the prior embodiments, a user receives a solicitation incorporating a URL and a code (step 730). The user then access the web site via the URL and is prompted for a code. The user then enters a code which can be a zip code, a name, or any type of code corresponding to a particular offer or set of offers (step 732). After the user enters the code, he can view a variety of offers relating to phone plans. The user is then able to select a phone plan of his choosing (step 734). For example, the user can select from different options of monthly fees, free minutes, local call details, peak rate charges, off-peak rate charges, the telephone and the cost. The user also may have the opportunity to select a phone and any accessories with the phone including power adaptors, ear pieces, clips, batteries, or any other type of accessory for the phone. The user then selects plan options (step 736). For example, the user can select voice mail options or caller identification options. After the user has made his selections, the user is then prompted to enter in personal data which may include name, address, home telephone number, work telephone number, e-mail address, shipping address, place of employment, bank information and social security number (step 738). The system then performs a check using the user's social security number to determine if the contract is accepted (step 740). If the user has bad credit, or his application is rejected for any reason, the user has an opportunity to secure the transaction with his credit card (step 742). Once the contract is accepted, the user selects a telephone number from the selections offered at the web site (step 744). A receipt or summary of the transaction is then displayed for the user (step 746). It can be appreciated by one of ordinary skill in the art that any type of service or merchandise can be offered and accepted using this method.

Figure 8:
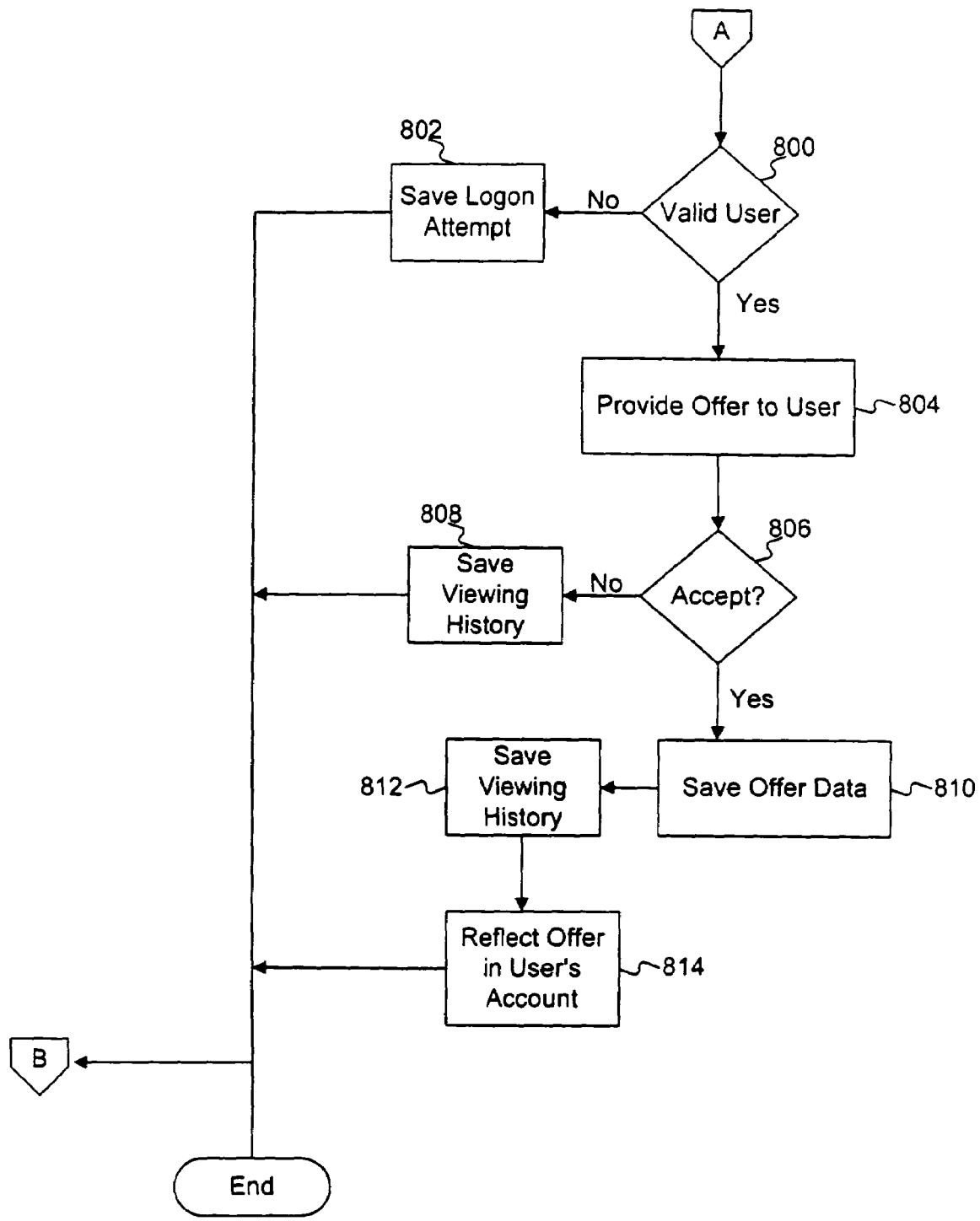
FIG. 8 depicts an exemplary flow chart of the specific steps performed for saving a user's access history information consistent with the present invention.

FIG. 8 depicts a flowchart for an alternative embodiment wherein a user or customer's viewing history is saved. After the user accesses the web site via the URL and enters any verifying data (see FIGS. 7A and 7B), a determination is made as to whether the user is a valid user (step 800). If the user is not a valid user, further access is denied to the offers, and the user's attempt to log in is saved in the user's access history data table (step 802). If the user is a valid user, the offer is provided to the user (step 804). The user then has the opportunity to either reject or accept the offer (step 806). If the user rejects the offer, the user's entire viewing history is saved in user's access history data table 307 (step 808). If the user accepts the offer, the offer data is saved in the offer data table 305 (step 810), the user's entire viewing history is saved in user's access history data table 307 (step 812), and the offer is reflected in the user's account (step 814).

Figure 9:
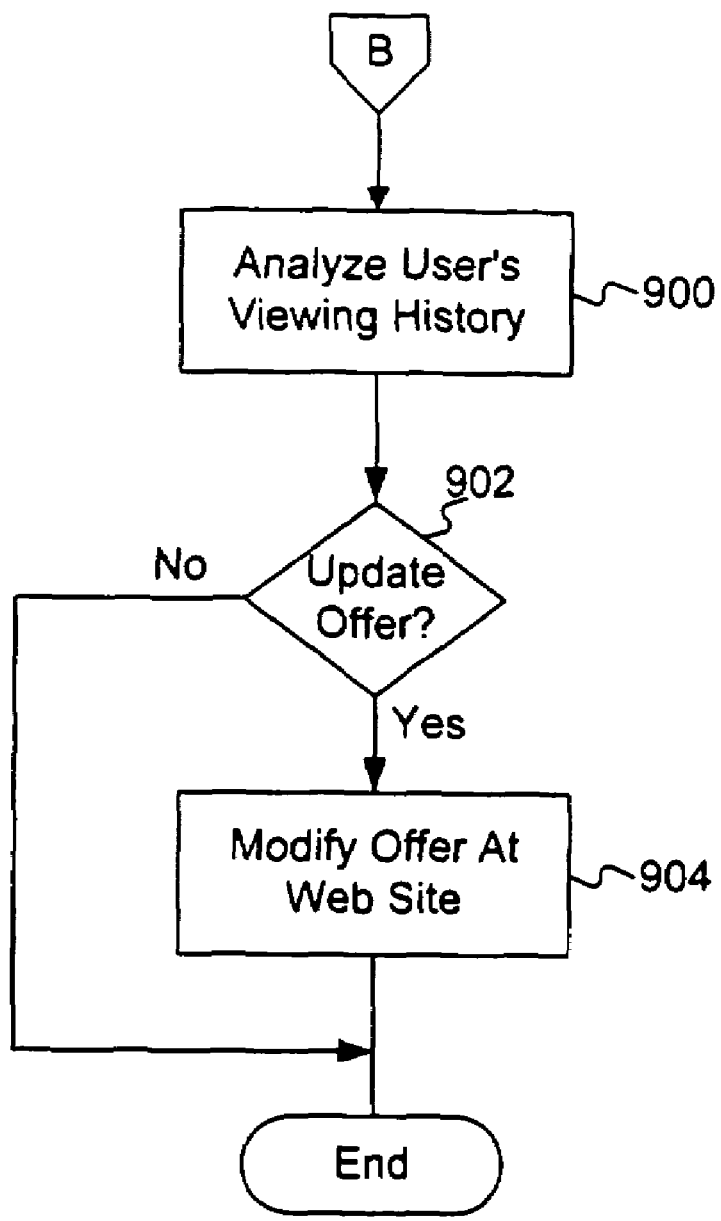
FIG. 9 depicts an exemplary flow chart for the specific steps performed for actively updating offers consistent with the present invention.

Saving the user's viewing or access history can provide valuable information regarding the effectiveness of the offers presented to the users, regardless of whether they are potentially new customers or existing customers. FIG. 9 depicts a flowchart of the process for determining whether an offer should be updated (See FIG. 8). As described above, the viewer's access history is saved in viewer's access history data table 307. This data can be analyzed to determine the effectiveness of the offers being provided to the users (step 900). If a solicitation, provided to a set of recipients sharing pre-selected characteristics, is frequently rejected, a determination can be made on whether to update the offer. For example, if an offer for a certain interest rate is being offered to a set of recipients located in a particular zip code, and the majority of the users are rejecting the offer, then a determination can be made to reduce the interest rate. If the determination is made to modify the offer, then database 110 and/or the offer data table 305 is updated to reflect the new offer (step 904). Thus, the next user to access the web site with the code correlating to the modified offer will be provided with the new offer.

User Interface

Figure 10:
FIG. 10 is an exemplary pictorial diagram of a view presented to a user when the web site is first accessed consistent with the present invention.

FIG. 10 depicts an exemplary pictorial diagram of a view presented to a user upon accessing the web site using the URL. Spaces are provided for the user to enter his customer account number, zip code, and the promotion code that provided in the solicitation. Upon entering the requested data, and after being verified by the system, the user may be provided with the offer corresponding to the code.

FIG. 11 depicts an exemplary pictorial diagram of a view presented to the user after verifying information has been entered and the verifying process determines a valid user. The view informs the user that a response has already been received for the offer corresponding to the code the user entered.

Figure 12:
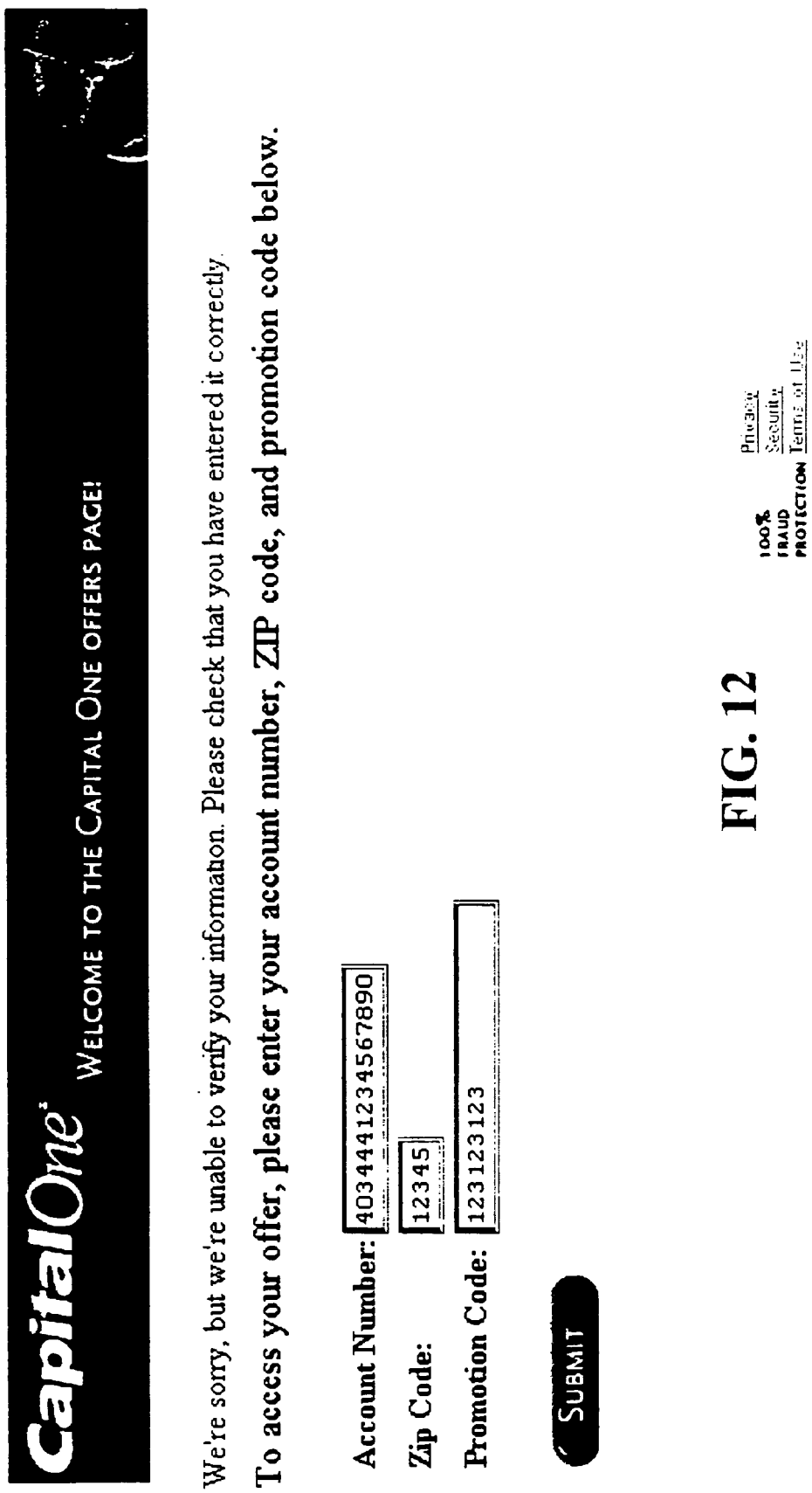
FIG. 12 is an exemplary pictorial diagram of a view presented to a user when the information the user entered is not verified consistent with the present invention.

FIG. 12 depicts an exemplary pictorial diagram of a view presented to a user when the user has entered data that cannot be verified. The user is requested to either re-enter the data or enter the correct data.

FIG. 13. depicts an exemplary pictorial diagram of a view presented to a user after he has entered verifying data and he is considered a valid user. The user is then provided with an offer corresponding to the code the user entered. In this example, the user is offered a reduction in his annual membership fee, effective upon renewal of the user's account. The user also has an opportunity to receive offers on a regular basis by providing the system with his e-mail address.

Figure 14:
FIG. 14 is an exemplary pictorial diagram of a view presented to a user when an offer is accepted by the user consistent with the present invention.

FIG. 14 depicts an exemplary pictorial diagram of a view presented to a user after he has entered verifying data and he is considered a valid user. Upon reviewing the offer and after accepting the offer, the view would be provided to the user acknowledging the request.

Figure 15:
FIG. 15 is an exemplary pictorial diagram of a view presented to a user when an offer is rejected by the user consistent with the present invention.

FIG. 15 depicts an exemplary pictorial diagram of a view presented to a user after he has entered verifying data and he is considered a valid user. Upon reviewing the offer and after rejecting the offer, either expressly or by failing to proceed to the next screen, the user may be presented with this view advising his of the deadline to accept the offer.

CONCLUSION

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. A method for providing solicitations and web-based offers and receiving corresponding responses thereto comprising:
    providing a solicitation to a set of users sharing pre-selected characteristics, incorporating in the solicitation at least an offer code and a universal resource locator (URL) corresponding to a web site;
    receiving a request to access the web site through the URL and receiving the offer code via the accessed web site;
    providing, via the accessed web site, an offer for a service to at least one of the set of users, wherein the provided offer for a service corresponds to the received offer code;
    receiving, via the accessed web site, a response to the offer for a service from the at least one of the set of users;
    collecting information reflecting an access history of the at least one user in relation to the offer for a service;
    modifying one or more financial terms of the offer for a service based on the collected information and the response; and
    presenting the modified offer for a service to the at least one of the set of users.

2. The method of claim 1, wherein the offer code incorporated in the solicitation is entered by the at least one of the set of users at the web site.

3. The method of claim 1, wherein the solicitation is sent through electronic means.

4. The method of claim 1, wherein receiving a request further includes:
    providing a customer identification number; and
    using the customer identification number to verify the at least one of the set of users.

5. The method of claim 1, wherein the offer provides for adjusting existing customer account financial terms.

6. The method of claim 1, wherein the offer includes financial terms for at least one new customer.

7. The method of claim 1, further including:
    adjusting a customer's account financial terms based on the response.

8. The method of claim 1, further including:
    creating a new customer account based on the response.

9. The method of claim 1, wherein modifying the offer includes:
    analyzing the collected information; and
    modifying the offer based on the analysis.

10. The method of claim 1, wherein a customer's account is automatically updated based on the response.

11. A method for accessing web-based offers comprising:
receiving a solicitation with at least an offer code and a universal resource locator (URL) corresponding to a web site;
accessing the web site through the URL;
providing the offer code via the accessed web site;
receiving, via the accessed web site, a set of offers for services based on the entered offer code;
providing a response to the received set of offers for services via the web site; and
receiving at least one modified offer via the web site, wherein the at least one modified offer is included in the set of offers for services and whose financial terms have been modified based on stored viewing history information reflecting the access history of the web site in relation to the set of offers for services and the response.

12. The method of claim 11, wherein the set of offers relate to cellular telephone services.

13. The method of claim 11, wherein the set of offers relate to financial services.

14. A method for providing web-based offers and receiving responses thereto comprising:
providing a web site that provides a prompt for an offer code, wherein the offer code is included in a solicitation;
receiving the offer code via the prompt;
displaying at least one offer for a service corresponding to the received offer code;
receiving a response to the at least one offer for a service;
collecting information reflecting a viewing history related to the at least one offer for a service;
modifying the financial terms of the at least one offer for a service based on the collected information and the response; and
presenting the at least one modified offer for a service to at least one user.

15. The method of claim 14, wherein the at least one offer relates to cellular telephone services.

16. The method of claim 14, wherein the at least one offer relates to financial services.

17. An apparatus for providing solicitations and web-based offers and receiving corresponding responses thereto comprising:
a providing module for providing a solicitation to a set of users sharing pre-selected characteristics, incorporating in the solicitation at least an offer code and a universal resource locator (URL) corresponding to a web site;
a receiving module for receiving a request to access the web site through the URL and receiving the offer code via the accessed web site;
a providing module for providing, via the accessed web site, an offer for a service to at least one of the set of users, wherein the provided offer for a service corresponds to the received offer code;
a receiving module for receiving, via the accessed web site, a response to the offer for a service from the at least one of the set of users;
a collecting module for collecting information reflecting an access history of the at least one of the set of users in relation to the offer for a service;
a modifying module for modifying one or more financial terms of the offer for a service based on the collected information and the response; and
presenting the modified offer for a service to the at least one of the set of users.

18. The apparatus of claim 17, wherein the offer code incorporated in the solicitation is entered by the at least one of the set of users at the web site.

19. The apparatus of claim 17, wherein the solicitation is sent through electronic means.

20. The apparatus of claim 17, wherein the receiving module for receiving the request further includes:
a providing module for providing a customer identification number; and
a using module for using the customer identification number to verify the at least one of the set of users.

21. The apparatus of claim 17, wherein the offer provides for adjusting existing customer account financial terms.

22. The apparatus of claim 17, wherein the offer includes financial terms for new customers.

23. The apparatus of claim 17, further including:
an adjusting module for adjusting a customer's account financial terms based on the response.

24. The apparatus of claim 17, further including:
a creating module for creating a new customer account based on the response.

25. The apparatus of claim 17, wherein the modifying module further includes:
an analyzing module for analyzing the collected information; and
a modifying module for modifying the financial terms of the offer based on the analysis.

26. The apparatus of claim 17, wherein a customer's account is automatically updated based on the response.

27. An apparatus for accessing web-based offers comprising:
a receiving module for receiving a solicitation with at least an offer code and a universal resource locator (URL) corresponding to a web site;
an accessing module for accessing the web site through the URL and providing the offer code via the accessed web site;
a receiving module for receiving, via the accessed web site, a set of offers, wherein at least one offer is for a service and is based on the entered offer code;
a providing module for providing a response to the received at least one offer at the web site;
a receiving module for receiving at least one modified offer via the web site, wherein the at least one modified offer is included in the at least one offer and whose financial terms have been modified based on stored history information reflecting the access history of the web site in relation to the at least one offer and the response.

28. The apparatus of claim 27, wherein the at least one offer relates to cellular telephone services.

29. The apparatus of claim 27, wherein the at least one offer relates to financial services.

30. An apparatus for providing web-based offers and receiving responses thereto comprising:
a providing module for providing a web site that provides a prompt for an offer code, wherein the offer code is included in a solicitation;
a receiving module for receiving the offer code via the prompt;
a displaying module for displaying at least one offer for a service corresponding to the received offer code;
a receiving module for receiving a response to the at least one offer for a service;
a collecting module for collecting information reflecting an access history of the web site related to the at least one offer for a service;

a modifying module for modifying one or more financial terms of the at least one offer for a service based on the collected information and the response; and a presenting module for presenting the at least one modified offer for a service to at least one user.

31. The apparatus of claim 30, wherein the at least one offer relates to cellular telephone services.

32. The apparatus of claim 30, wherein the at least one offer relates to financial services.

33. A computer-readable medium containing instructions for providing solicitations and web-based offers and receiving corresponding responses thereto comprising:

providing a solicitation to a set of users sharing pre-selected characteristics, incorporating in the solicitation at least an offer code and a universal resource locator (URL) corresponding to a web site;

receiving a request to access the web site through the URL and receiving the offer code via the accessed web site;

providing, via the accessed web site, an offer for a service to at least one of the set of users, wherein the provided offer for a service corresponds to the received offer code;

receiving, via the accessed web site, a response to the offer for a service from the at least one of the set of users;

collecting information reflecting an access history of the at least one of the set of users in relation to the offer for a service;

modifying the financial terms of the offer for a service based on the collected information and the response; and presenting the modified offer for a service to the at least one of the set of users.

34. The computer-readable medium of claim 33, wherein the offer code incorporated in the solicitation is entered by the at least one of the set of users at the web site.

35. The computer-readable medium of claim 33, wherein the solicitation is sent through electronic means.

36. The computer-readable medium of claim 33, wherein receiving the request further includes:

providing a customer identification number; and using the customer identification number to verify the at least one of the set of users.

37. The computer-readable medium of claim 33, wherein the offer provides for adjusting existing customer account financial terms.

38. The computer-readable medium of claim 33, wherein the offer includes financial terms for new customers.

39. The computer-readable medium of claim 33, further including:

adjusting a customer's account financial terms based on the response.

40. The computer-readable medium of claim 33, further including:

creating a new customer account based on the response.

41. The computer-readable medium of claim 33, wherein modifying the offer includes:

analyzing the history information; and modifying the offer based on the analysis.

42. The computer-readable medium of claim 33, wherein a customer's account is automatically updated based on the response.

43. A computer-readable storage medium containing instructions for accessing web-based offers comprising:

receiving a solicitation with at least an offer code and a universal resource locator (URL) corresponding to a web site;

accessing the web site through the URL and entering the offer code via the accessed web site;

receiving, via the accessed web site, a set of offers for services based on the entered offer code;

providing a response to the received set of offers for services at the web page; and receiving at least one modified offer via the web site, wherein the at least one modified offer is included in the set of offers for services and whose financial terms have been modified based on stored viewing history information reflecting a history of access to the web site in relation to the set of offers for services and the response.

44. The computer-readable medium of claim 43, wherein the set of offers relate to cellular telephone services.

45. The computer-readable medium of claim 43, wherein the set of offers relate to financial services.

46. A computer-readable medium containing instructions for providing web-based offers and receiving responses thereto comprising:

providing a web site that provides a prompt for an offer code, wherein the offer code is included in a solicitation;

receiving the offer code via the prompt;

displaying at least one offer for a service corresponding to the received offer code;

receiving a response to the at least one offer for a service;

collecting information reflecting an access history of the web site related to the at least one offer for a service;

modifying the financial terms of the at least one offer for a service based on the collected information and the response; and presenting the at least one modified offer for a service to at least one user.

47. The computer-readable medium of claim 46, wherein the at least one offer relates to cellular telephone services.

48. The method of claim 1, further including:

providing the modified offer to at least one of the at least one user and at least one different user.

49. The method of claim 14, further including:

providing the at least one modified offer to at least one of the at least one user.

50. The apparatus of claim 17, further including:

a providing module for providing the modified offer to at least one of the at least one user and at least one different user.

51. The apparatus of claim 30, further including:

a providing module for providing the modified offer.

52. The computer-readable medium of claim 33, further including:

providing the modified offer to at least one of the at least one of the set of users and at least one different user.

* * * * *

UNITED STATES PATENT AND TRADEMARK OFFICE
CERTIFICATE OF CORRECTION

PATENT NO. : 7,650,304 B1 Page 1 of 1
APPLICATION NO. : 09/658186
DATED : January 19, 2010
INVENTOR(S) : Metsker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1844 days.

Signed and Sealed this

Twenty-third Day of November, 2010

David J. Kappos
*Director of the United States Patent and Trademark Office*